US008666162B1

(12) United States Patent
Vakrat

(10) Patent No.: US 8,666,162 B1
(45) Date of Patent: Mar. 4, 2014

(54) ADVANCED SENSOR BINNING CORRECTION

(75) Inventor: David Vakrat, Netanya (IL)

(73) Assignee: CSR Technology Inc., San Jose, CA (US)

( * ) Notice: Subject to any disclaimer, the term of this patent is extended or adjusted under 35 U.S.C. 154(b) by 121 days.

(21) Appl. No.: 13/330,553

(22) Filed: Dec. 19, 2011

Related U.S. Application Data

(60) Provisional application No. 61/425,040, filed on Dec. 20, 2010.

(51) Int. Cl.
*G06K 9/00* (2006.01)
(52) U.S. Cl.
USPC .......................................... 382/167; 382/162
(58) Field of Classification Search
USPC ..................... 382/162, 167; 358/3.26; 359/16; 348/246, 272, 222.1, E9.637; 345/600
See application file for complete search history.

(56) References Cited

U.S. PATENT DOCUMENTS

| | | |
|---|---|---|
| 3,971,065 A | 7/1976 | Bayer |
| 7,227,991 B2 * | 6/2007 | Castorina et al. ............. 382/167 |
| 7,397,944 B2 * | 7/2008 | Spampinato et al. ......... 382/162 |
| 7,995,108 B2 * | 8/2011 | Utsugi ....................... 348/222.1 |
| 8,305,458 B2 * | 11/2012 | Hara ........................... 348/222.1 |

* cited by examiner

*Primary Examiner* — Anh Do
(74) *Attorney, Agent, or Firm* — Frommer Lawrence & Haug LLP; John W. Branch

(57) ABSTRACT

A system, method, and computer program product for improving digital images and video by reducing or eliminating artifacts created by sensor binning, i.e. channel displacement of downscaled image pixels. Red and blue pixels are shifted to corresponding ideal pixel locations using for example bi-linear interpolation for each color. Green pixels are shifted to corresponding ideal pixel locations using one-dimensional cubic interpolation along a diagonal direction in which the green pixels are aligned. Pixel values are replaced by weighted pixel value averages of groups of pixels, preferably four, and the weights used vary inversely with shifted distances. Cubic interpolation results may be separately weighted pairwise among pixels with a weighting parameter favoring pixels near the ideal pixel location. The embodiments noticeably improve image and video quality, particularly by treatment of jagged edges of diagonal image features without compromising image sharpness or creating false colors along edges.

25 Claims, 4 Drawing Sheets

EXAMPLE:

(A) - BAYER IMAGE BEFORE SENSOR BINNING (B) - BAYER IMAGE AFTER SENSOR BINNING (DOWNSCALING RATIO OF 1:2 IN HORIZONTAL AND VERTICAL DIRECTION)

(C) - BAYER IMAGE AFTER SENSOR BINNING CORRECTION, USING INTERPOLATION IN ORDER TO SHIFT THE PIXELS TO THEIR IDEAL LOCATIONS

ADVANCED SENSOR BINNING CORRECTION

CROSS REFERENCE TO RELATED APPLICATIONS

This application is based upon and claims the benefit under 35 U.S.C. 119(e) of commonly-assigned U.S. provisional application Ser. No. 61/425,040, filed Dec. 20, 2010, and entitled "Advanced Sensor Binning Correction", which is hereby incorporated by reference in its entirety.

FIELD OF THE INVENTION

This patent application relates in general to digital image processing, and more specifically to handling channel displacement of downscaled image pixels to avoid creation of undesirable image artifacts.

BACKGROUND OF THE INVENTION

Most single-chip digital image sensors used in digital cameras, camcorders, and scanners to create a color image use a Bayer filter mosaic. This type of color filter array, as described in U.S. Pat. No. 3,971,065 which is hereby incorporated by reference, includes a square grid of photosensors covered with red, green, and blue filters. The filter pattern is 50% green, 25% red and 25% blue. Rows of red and green filters alternate with rows of blue and green filters, with the green filters in different rows offset by one column.

Image sensors (e.g. CCDs and CMOS sensors) normally support modes of reduced resolution in order to achieve higher frame rates. When operating in these modes, the Bayer filter image will undergo downscaling before it is read out from the sensor. The operation of Bayer downscaling performed in the sensor is often called "sensor binning", and is performed by summing (or averaging) several input photosensor signals into one output pixel. Sensor binning is commonly applied during movie capture, where high frame rates are required, albeit at the expense of resolution.

When performing image downscaling, it is usually important to maintain the property that neighboring image pixels are equally spaced from each other. Pixel locations complying with this property are referred to as being "ideal" because they lie on a uniform grid. One common side effect of sensor binning is "channel displacement", meaning that the pixels of the downscaled image are spatially displaced from their ideal locations. This displacement is different for each of the four Bayer channels: R, Gr, Gb, B (where Gr refers to green pixels in a line containing red pixels, Gb refers to green pixels in a line containing blue pixels). In other words, the red component of the downscaled image is displaced in one direction, the Gr component of the downscaled image is displaced in another direction, and so on. The result is that the property of equal spacing between neighboring pixels is violated in the down-scaled image.

For example, let p be the spacing between one pixel to its neighboring pixel on one side, and let q be the spacing between the same pixel to its neighboring pixel on the opposite side. The "channel displacement ratio" is then defined as p/q. If the channel displacement ratio is equal to one, then there is no channel displacement, and the property of equal spacing between neighboring pixels is maintained. If the ratio is different than one, then there is channel displacement, and the property of equal spacing between neighboring pixels is violated. Channel displacement ratios may be different in the horizontal and vertical directions, or may be the same.

The side effects of channel displacement include jagged diagonal edges and false colors along edges. The present invention is directed to reducing or eliminating these undesirable artifacts.

Referring now to FIG. 1, an example is presented for conventional sensor binning, in this case reducing image resolution by factor of 1:2 in each direction (horizontal and vertical). According to this particular example, each 4×4 pixel unit is reduced to a 2×2 pixel unit in the following manner:

- All four red pixels within the 4×4 pixel unit are summed (or averaged) in order to produce one red pixel. Since all four red pixels were summed (or averaged) with the same weight, the output red pixel is located exactly in the middle of the four red pixels.
- All four Gr pixels within the 4×4 pixel unit are summed (or averaged) in order to produce one Gr pixel. Since all four Gr pixels were summed (or averaged) with the same weight, the output Gr pixel is located exactly in the middle of the four Gr pixels.
- All four Gb pixels within the 4×4 pixel unit are summed (or averaged) in order to produce one Gb pixel. Since all four Gb pixels were summed (or averaged) with the same weight, the output Gb pixel is located exactly in the middle of the four Gb pixels.
- All four blue pixels within the 4×4 pixel unit are summed (or averaged) in order to produce one blue pixel. Since all four blue pixels were summed (or averaged) with the same weight, the output blue pixel is located exactly in the middle of the four blue pixels.

When comparing FIG. 1 image (b) to image (c), presenting the ideal location of the pixels, it is clear that in image (b) the red component of the downscaled image is displaced in the bottom-right direction from its ideal location. The Gr component of the downscaled image is displaced in the bottom-left direction from its ideal location. The Gb component of the downscaled image is displaced in the top-right direction from its ideal location. And the blue component of the downscaled image is displaced in the top-left direction from its ideal location.

Also, in image (b) of FIG. 1, there is not equal spacing between neighboring pixels. The spacing between red pixels and neighboring green pixels on the right is one [opu] (opu is "Original Pixel Unit"). However, the spacing between red pixels and neighboring green pixels on the left is three [opu]. This means that the channel displacement ratio in the horizontal direction is 1:3.

In the particular example presented in FIG. 1, sensor binning in the vertical direction is done exactly the same as in the horizontal direction, and therefore channel displacement ratio is 1:3 in both directions. However, this is not necessarily so. Some sensor binning schemes may invoke different channel displacement ratios in the horizontal direction and in the vertical direction.

The channel displacement side effect of sensor binning is currently handled in the art in two basic ways:

1. Post Demosaicing solutions—this option includes filters operating in the RGB/YUV domain, for example:
   a. Applying a chroma low pass filter or a chroma median filter to remove the false colors caused by channel displacement.
   b. Applying an edge preserving luma low pass filter, in order to smooth the diagonal luma edges (as mentioned earlier, channel displacement causes jagged diagonal edges).

Post demosaicing solutions may solve the problem to some extent, but they may also cause a lot of damage to the image, such as excessive edge smoothing (loss of sharpness), chroma blur, discontinuities, etc. One of the reasons is that demosaicing normally enhances the side effects of channel displacement, and in a way that makes it more difficult to correct without damaging the image.

2. Pre Demosaicing solutions—these include applying a diagonal edge smoothing filter on the green channel, similar to the edge preserving luma low pass filter mentioned before. However, the common pre-demosaicing solution for correcting the channel displacement side effects of sensor binning is to apply some operator on the Bayer image that will shift the pixels to their ideal location, by means of interpolation (see FIG. 1, image (c)).

Normally, bi-linear interpolation will be applied separately on each of the four components of the image (R, Gr, Gb, and B). However, bi-linear interpolation has the side effect of blurring the image. Alternatively, it is possible to apply bi-cubic interpolation separately on each of the four components of the image. This will produce a sharper image. However, applying bi-cubic interpolation separately on each channel may require a big filter and heavy computation. Also, bi-cubic interpolation results will still not be sufficiently accurate, and artifacts may still occur. This is mainly due to the fact that in both methods (bi-linear and bi-cubic) the Gb pixels are not considered when shifting the Gr pixels, and the Gr pixels are not considered when shifting the Gb pixels.

SUMMARY OF THE EMBODIMENTS

Systems, methods, and computer program products for correcting digital image artifacts due to sensor binning are disclosed and claimed herein.

As described more fully below, the apparatus and processes of the embodiments disclosed permit reduction or elimination of image artifacts created by channel displacement of downscaled image pixels. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

Describing the present invention in terms of an exemplary processor-implemented method embodiment for correcting a Bayer image having pixels displaced from ideal pixel locations on a uniform Cartesian grid by shifting the pixels toward ther ideal locations, the method comprises shifting chromaticity pixels with any kind of interpolation, and shifting luma pixels with one-dimensional interpolation along a luma pixel alignment diagonal. The pixel displacement may be due to Bayer image downscaling performed within an image sensor. Alternately, an embodiment may shift luma pixels with any kind of interpolation, where the shifting of Yr pixels depends on Yb pixels, and vice-versa.

The chromaticity pixels may comprise Cr pixels and Cb pixels, and the luma pixels may comprise Yr pixels and Yb pixels. The chromaticity pixels may comprise red pixels and blue pixels, and the luma pixels may comprise green pixels.

Shifting the chromaticity pixels may comprise bi-linear interpolation, which may be implemented using a 5×5 window operator, a horizontal interpolation followed by a vertical interpolation, and/or a vertical interpolation followed by a horizontal interpolation.

Shifting luma pixels may comprise one-dimensional cubic interpolation along a luma pixel alignment diagonal. The cubic interpolation may be implemented using a 5×5 window operator. Shifting of luma pixels on a line containing pixels of a particular color may depend on pixel values of a different color, and the shifting of the luma pixels on a line containing pixels of the different color may depend on pixel values of the particular color, i.e. the shifting of Yr pixels depends on Yb pixels and vice-versa. The method may further comprise clipping each interpolation result.

The method may further comprise shifting at least some pixel values by a weighted pixel value average of a group of corresponding color pixels closest to a corresponding ideal pixel location, and shifting at least some pixel values by a weighted pixel value average of a group of corresponding color pixels closest to a corresponding ideal pixel location along a pixel alignment diagonal. The groups of pixels may comprise four pixels. The weights used in the weighted averages may be determined according to a displacement between an original pixel location and the corresponding ideal pixel location, and according to a chosen interpolation kernel. The weights may vary inversely with the displacement of each pixel in the group from the ideal pixel location.

A sharpness parameter, alpha, may determine a sharpness of the interpolation kernel. Alpha may be determined by calculating a third degree polynomial passing through the group of pixels along the pixel alignment diagonal, and sampling the polynomial in the ideal pixel location.

In a system embodiment, a processor may execute instructions stored in a memory to perform the method steps. An integrated circuit embodiment may comprise circuit elements that also perform the method steps.

In a computer program product embodiment, a machine-readable medium tangibly embodies non-transitory program instructions thereon that, when executed by the machine, may cause the machine to perform the method steps.

DETAILED DESCRIPTION OF EXEMPLARY EMBODIMENTS

Figure 1:
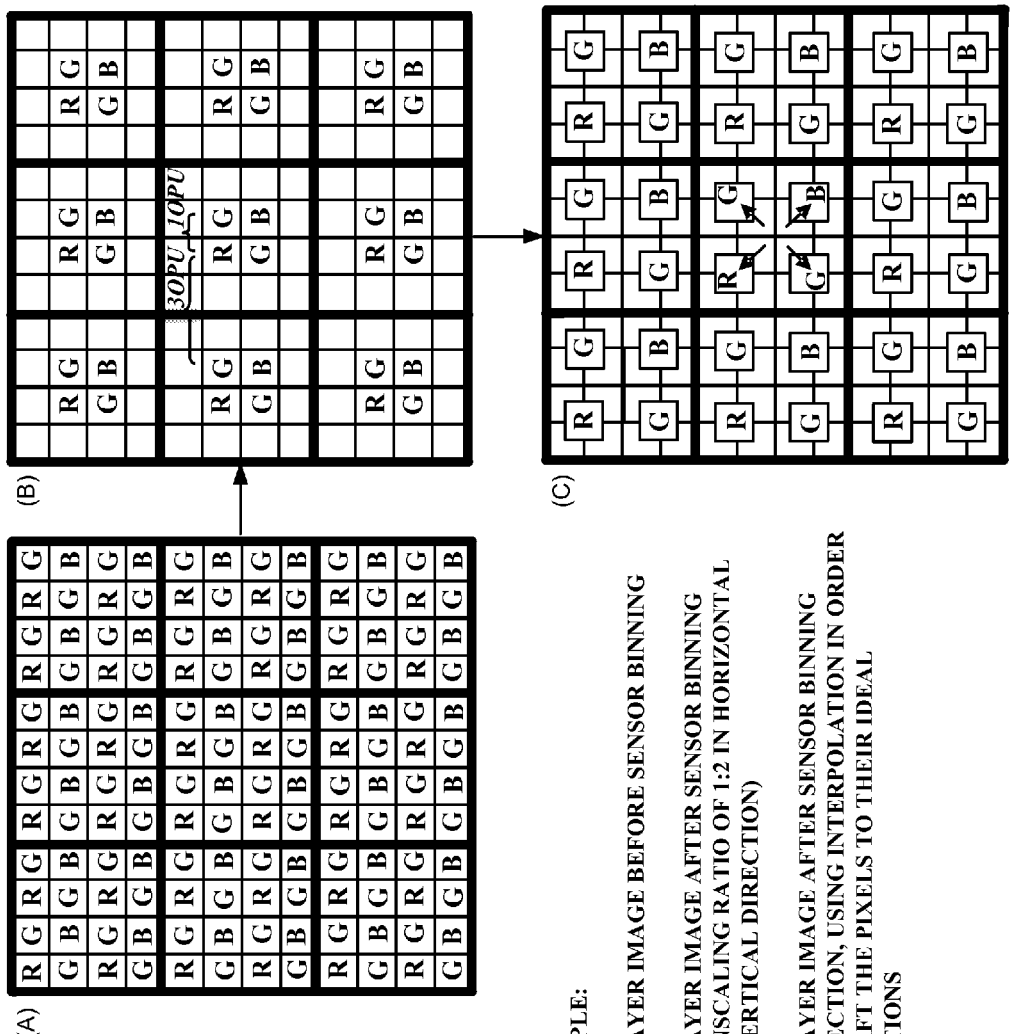
FIG. 1 depicts conventional sensor binning and sensor binning correction.

This patent application describes a new methodology for correcting artifacts from sensor binning. In the context of this invention, the term "sensor binning" relates to any kind of Bayer downscaling performed in the sensor, where channel displacement may take place in the downscaled image. For example, sensors may perform line/column skipping in addition to or instead of line/column summing/averaging. In the context of the present invention, such methods are also referred to as "sensor binning", and since they too may suffer from channel displacement, they are also covered by the invention.

According to the new methodology, red and blue pixels are preferably shifted to their ideal locations on a uniform grid using bi-linear interpolation. Green pixels, on the other hand, are preferably shifted to their ideal locations on a uniform grid using one-dimensional cubic interpolation along the diagonal direction.

The new interpolation method for shifting the exemplary green pixels to their ideal locations is important because channel displacement of the green pixels is responsible for most of the artifacts caused by sensor binning (mainly because the Gr channel is displaced differently from the Gb channel). The most disturbing such artifacts are jagged diagonal edges, which are quite apparent in videos. Also, high quality interpolation of the green channels is a key factor in maintaining the sharpness of the image. The new interpolation methodology does not damage the sharpness of the image, and it provides more accurate restoration of diagonal edges, even those that are only slightly diagonal. In addition, the present invention is simple to implement, and its embodiments do not require more resources compared with other methods. The methodology for sensor binning correction is performed on the Bayer image, before demosaicing.

A preferred embodiment of the new methodology is limited to cases where the channel displacement ratio is the same in the horizontal direction as in the vertical direction.

In this description, particular examples are provided in terms of red, green, and blue color values, but the invention may also operate on luma (i.e., luminance or brightness) and chromaticity (i.e. color) component values more generally. For example, the RGB image information in the dataset (Gr, Gb, R, and B) may also be represented and processed in YCbCr format, e.g., Yr denotes a luma pixel in a Cr line, and Yb denotes a luma pixel in a Cb line. Normally, (Yr, Yb, Cr, and Cb) are in fact (Gr, Gb, R, and B).

Shifting of R pixels and B pixels is done by means of any type of interpolation, such as bi-linear interpolation. According to this methodology, the value of each red pixel is replaced by a weighted average of the four red pixels that are closest to its ideal location. Similarly, the value of each blue pixel is replaced by a weighted average of the four blue pixels that are closest to its ideal location.

The weights in the weighted average are determined according to the displacement between the original pixel location and the new ideal pixel location. They may be derived from the channel displacement ratio in the following manner. Assuming (a:b) is the channel displacement ratio, the amount of shifting that needs to be performed in the diagonal direction may be calculated using the following formula:

$$\text{Shift} = \frac{|a-b|}{2*(a+b)}[spu]$$

where "spu" stands for "Scaled Pixel Unit".

Considering that due to the Bayer pattern, interpolation is not performed with the closest pixels, but with the closest same-color pixels, the weights are as follows:

The weight of the red/blue pixel closest to the ideal location (which is the current pixel itself) is $(1-\text{shift}/2)^2$. The weight of the red/blue pixel furthest from the ideal location is $(\text{shift}/2)^2$. The weight of the other two pixels is $(\text{shift}/2)(1-\text{shift}/2)$.

Figure 2:
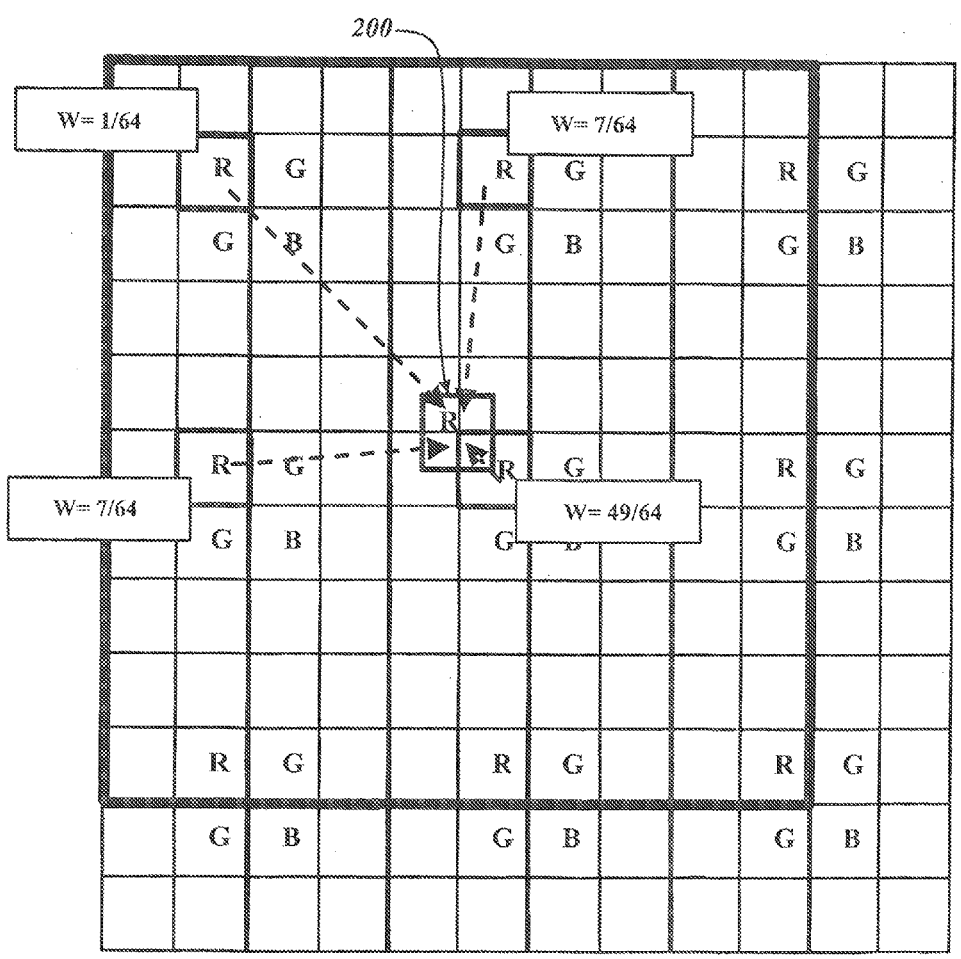
FIG. 2 depicts red pixel interpolation according to an embodiment.

Referring now to FIG. 2, the process of bi-linear interpolation is demonstrated on red pixels. In this particular example, red pixels need to be shifted in the top-left direction, and channel displacement ratio is 1:3 in both the horizontal and vertical directions. The value of each red pixel is replaced by a weighted average of the four red pixels that are closest to its ideal location.

According to the formula above, shift=abs(1−3)/(2* (3+1))= 1/4.

The weight of the red pixel closest to the ideal location (which is the current pixel itself) is $(7/8)^2=49/64$. The weight of the red/blue pixel furthest from the ideal location is $(1/8)^2=1/64$. The weight of the other two pixels is $(1/8)(7/8)=7/64$.

Note that in FIG. 2, red pixels are shifted in the top-left direction, and although not shown in this figure, blue pixels will be shifted in the bottom-right direction. However, in other cases red pixels may have to be shifted in other directions (top-right, bottom-left, bottom-right), depending on the pixel array and binning scheme of the sensor. Blue pixels will normally be shifted in the opposite direction from red pixels.

Bi-linear interpolation of red and blue pixels may be implemented using a sliding 5×5 window operator. Bold frame 200 marks the 5×5 window around the current red pixel. However, there may be other implementation methods, such as applying linear interpolation in the horizontal direction, followed by linear interpolation in the vertical direction, or vice versa.

Green pixels will be shifted to their ideal location by one-dimensional interpolation, such as cubic interpolation, along one of the diagonal directions. This methodology provides more accurate restoration of green pixel values, because contrary to other interpolation methods (such as the bi-linear method), Gb pixels are considered when shifting the Gr pixels, and Gr pixels are considered when shifting the Gb pixels. Also, the cubic interpolation maintains the sharpness of the image, and since it is one-dimensional, it does not require a lot of computation.

Given a sensor mode where binning is performed, it is first necessary to determine the preferred diagonal direction (top-left to bottom-right, or top-right to bottom-left) in which green pixels will be interpolated. In one of the diagonal directions, green pixels will be aligned on the diagonal. In the other diagonal direction, green pixels will not be aligned on the diagonal. The preferred direction for green pixel interpolation is the diagonal direction where green pixels are aligned on the diagonal. The preferred diagonal direction is determined per sensor mode.

Figure 3:
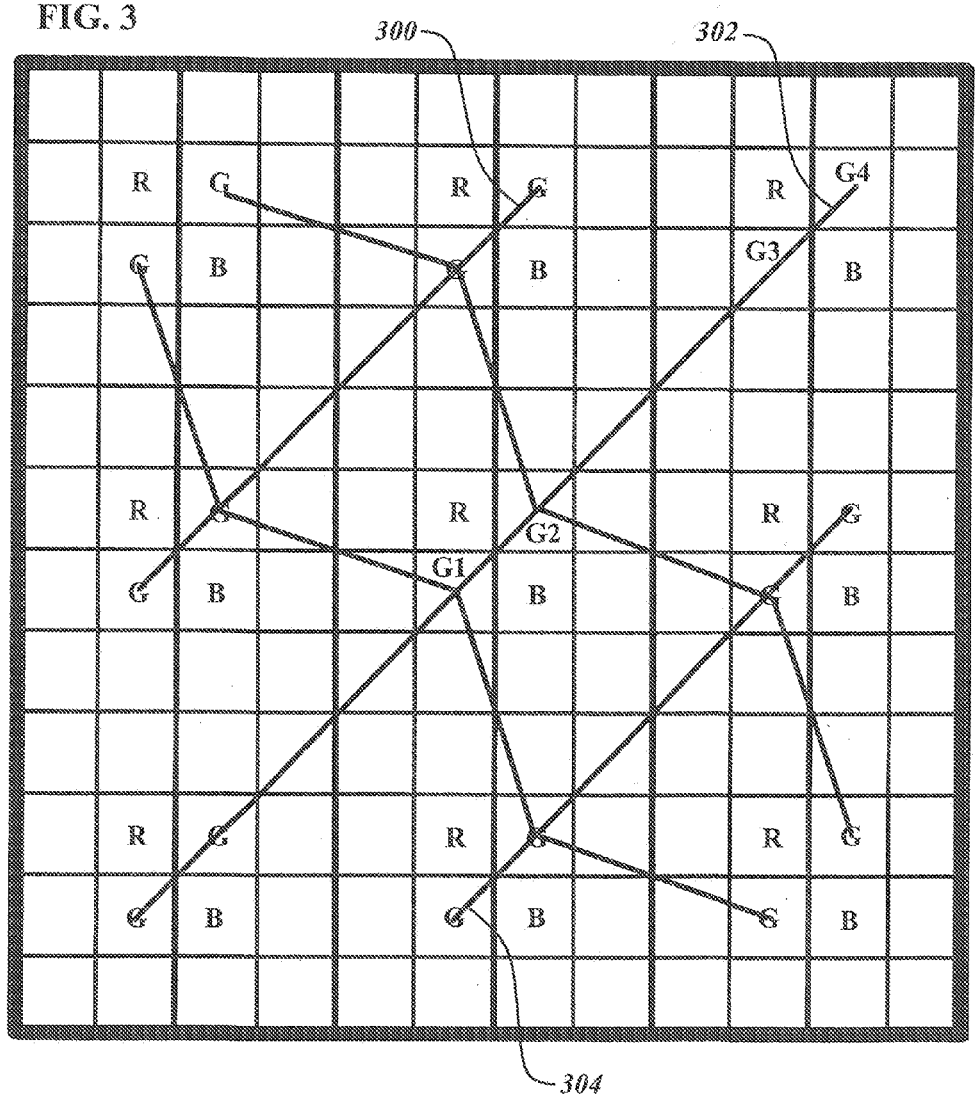
FIG. 3 depicts choosing the diagonal direction for green pixel interpolation according to an embodiment.

Referring now to FIG. 3, the process of choosing the diagonal direction for green pixel interpolation is demonstrated. In the particular example of FIG. 3, green pixels are aligned on the top-right to bottom-left diagonal (300, 302 and 304). They are clearly not aligned on the top left to bottom right diagonal. Therefore, green interpolation will be performed along the top-right to bottom-left diagonal. In other cases, it may be the other way around.

According to the interpolation methodology of the present invention, the value of each green pixel is replaced by a weighted average of the four green pixels that are closest to its ideal location, in the preferred diagonal direction. The weights in the weighted average are determined according to the displacement between the original location and the new ideal location, and according to the particular interpolation kernel selected via the alpha sharpness parameter. They may be derived from the channel displacement ratio in the following manner. Assuming (a:b) is the channel displacement ratio, the amount of shifting that needs to be performed in the diagonal direction may be calculated using the following formula:

$$\text{Shift} = \frac{|a-b|}{2*(a+b)}[spu]$$

where again "spu" stands for "Scaled Pixel Unit".

Out of the four green pixels, first take the inner pixel pair, which includes the closest pixels to the ideal location, one pixel from each side of the ideal location along the diagonal. When referring to these two pixels in the figure, the pixel closer to the ideal location is marked G2, and the other pixel is marked G3. A weighted average is performed between these two pixels, where the weight of each pixel is inversely proportional to its distance from the ideal location. In other words, Resc=(W23)*G3+(1−W23)*G2, where it can be shown that W23 is equal to:

$$W23 = \frac{\text{shift}}{1 + 2 * \text{shift}}$$

Next take the outer pixel pair, which includes the further pixels from the ideal location, one pixel from each side of the ideal location along the diagonal. When referring to these two pixels in the figure, the pixel closer to the ideal location is marked by G1, and the other pixel by G4. A weighted average is performed between these two pixels, where the weight of each pixel is inversely proportional to its distance from the ideal location. In other words, Resf=(W14)*G4+(1−W14)*G1, where it can be shown that W14 is equal to:

$$W14 = \frac{1 - \text{shift}}{3 - 2 * \text{shift}}$$

The final interpolation result is calculated in the following manner:

Gnew=(1+alpha)*Resc—alpha*Resf where alpha is a programmable sharpness parameter greater than or equal to zero. Higher values of alpha will produce sharper results. On the other hand, increasing alpha unreasonably will produce overshoot artifacts. Alpha values typically range between 0 and 0.6.

Finally, the weight of each of the four pixels may be derived from the equations above:

W1=−alpha*(1−W14)

W2=(1+alpha)*(1−W23)

W3=(1+alpha)*W23

W4=−alpha*W14

Note that the weight of each of the four pixels depends on the alpha sharpness parameter, as well as the displacement from the ideal location as previously described.

Note that in this application, the term "weighted average" is somewhat unconventional. One weight is always larger than one, and the other is negative, and the sum of the weights is one. In contrast, in a conventional weighted average, the weights would be between zero and one.

When one performs a weighted average of two pixels, one is essentially performing a one-dimensional linear interpolation. Bi-linear interpolation relies on exactly four neighboring pixels. Other types of interpolation may rely on various numbers of neighboring pixels. For example, one-dimensional cubic interpolation relies on exactly four neighboring pixels as well.

Thus, when the results of two linear interpolations are combined, so that four pixels are involved, one is basically performing a cubic interpolation. There are many types of cubic interpolation, each determined by a different interpolation kernel. By choosing a specific value for the alpha sharpness parameter, one determines the particular cubic interpolation kernel being used. Thus, the alpha sharpness parameter is an integral part of the cubic interpolation.

Each interpolation result needs to be clipped so that it will not exceed the dynamic range of the pixel. For example, the interpolation result may be negative, in which case it should be clipped to zero.

Note that calculating the coefficients is done offline per sensor mode. The only thing that needs to be calculated for each pixel is the weighted average of the four neighboring green pixels along the preferred diagonal. A similar calculation is relevant for red and blue pixels, where the four neighboring pixels are not located on a diagonal. Note also that the weights may also depend on the particular cubic kernel being used for the one-dimensional cubic interpolation.

A recommended value for the alpha parameter may be derived by calculating a third degree polynomial passing through the four green pixels, and then sampling this polynomial in the ideal location.

Figure 4:
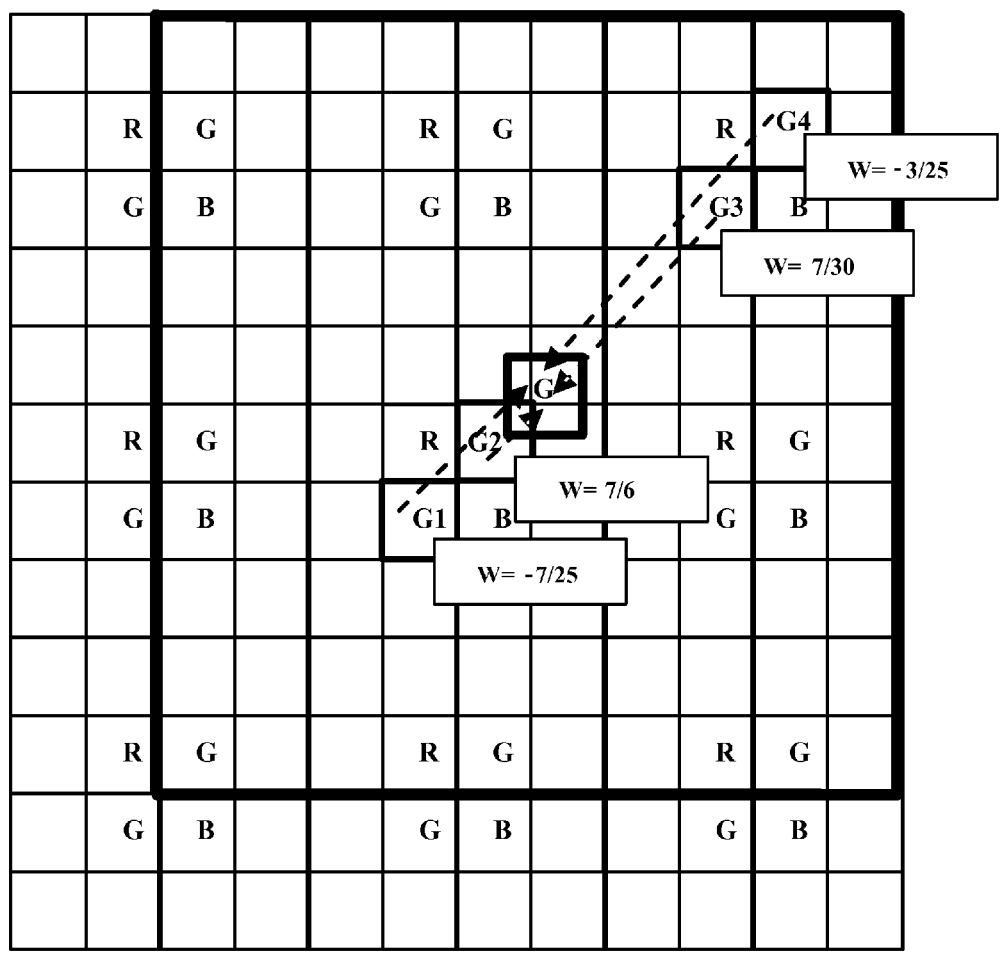
FIG. 4 depicts diagonal cubic interpolation on Gr pixels according to an embodiment.

Referring now to FIG. 4, the process of diagonal cubic interpolation is demonstrated on Gr pixels. In this particular example, Gr pixels need to be shifted to in the top-right direction, and the channel displacement ratio is 1:3 in both the horizontal and vertical directions. As shown in FIG. 3, the preferred diagonal direction in this case is top-right to bottom-left. The bold frame marks a 5×5 window around the current Gr pixel.

The value of each Gr pixel is replaced by a weighted average of the four green pixels that are closest to its ideal location, on the top-right to bottom-left diagonal. The alpha parameter is chosen to be 0.4. Thus, according to the formulas above:

Shift=1/4
W23=1/6
W14=3/10
The weight of G1: W1=−4/10*7/10=−7/25=−0.28
The weight of G2: W2=(1+4/10)*5/6=7/6=1.166
The weight of G3: W3=(1+4/10)*1/6=7/30=0.233
The weight of G4: W4=−4/10*3/10=−3/25=−0.12

Note again that in this weighting scheme the weights may be larger than one or negative, in contrast to a conventional weighted average.

Note that in FIG. 4, Gr pixels are shifted in the top-right direction, and although not shown in this figure, Gb pixels will be shifted in the bottom-left direction. However, in other cases Gr pixels may have to be shifted in other directions (top-left, bottom-left, bottom-right), depending on the pixel array and binning scheme of the sensor. Gb pixels will normally be shifted in the opposite direction from Gr pixels.

The diagonal cubic interpolation of the green pixels may be implemented using a sliding 5×5 window operator. In fact, it is possible to define a 5×5 window operator that will perform both bi-linear interpolation of R and B pixels, and the diagonal cubic interpolation of the green pixels.

A specific methodology has been described for performing diagonal interpolation of green pixels, where each green pixel is replaced by a weighted average of four neighboring pixels along the preferred diagonal, with formulas for calculating the weight of each pixel in the weighted average. However, the present invention covers any kind of one-dimensional green interpolation done along the preferred diagonal direction. Alternately, any kind of interpolation may be used for luma pixel shifting, wherein the shifting of Yr pixels also depends on Yb pixels, and vice-versa.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described above with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A processor-implemented method for correcting a Bayer image having pixels displaced from ideal pixel locations on a uniform Cartesian grid by shifting the pixels toward their ideal pixel locations, wherein processor hardware implements the method by performing actions, comprising:
   shifting chromaticity pixels with interpolation; and
   shifting luma pixels with one-dimensional interpolation along a luma pixel alignment diagonal.

2. The method of claim 1 wherein the pixel displacement is due to Bayer image downscaling performed within an image sensor.

3. The method of claim 1 wherein the chromaticity pixels comprise Cr pixels and Cb pixels, and the luma pixels comprise Yr pixels and Yb pixels.

4. The method of claim 1 wherein the chromaticity pixels comprise red pixels and blue pixels, and the luma pixels comprise green pixels.

5. The method of claim 1 wherein the shifting chromaticity pixels comprises bi-linear interpolation.

6. The method of claim 5 wherein the bilinear interpolation is implemented using one of a 5×5 window operator, a horizontal interpolation followed by a vertical interpolation, and a vertical interpolation followed by a horizontal interpolation.

7. The method of claim 1 wherein the shifting luma pixels comprises one-dimensional cubic interpolation.

8. The method of claim 7 wherein the cubic interpolation is implemented using a 5×5 window operator.

9. The method of claim 1 wherein the shifting of Yr pixels depends on Yb pixels, and vice-versa.

10. The method of claim 1 further comprising clipping each interpolation result.

11. The method of claim 1 further comprising:
   shifting at least some pixel values by a weighted pixel value average of a group of corresponding color pixels closest to a corresponding ideal pixel location; and
   shifting at least some pixel values by a weighted pixel value average of a group of corresponding color pixels closest to a corresponding idol pixel location along a pixel alignment diagonal.

12. The method of claim 11 wherein the groups of pixels comprise four pixels.

13. The method of claim 11 further comprising determining weights used in the weighted averages according to a displacement between an original pixel location and the corresponding ideal pixel location, and according to a chosen interpolation kernel.

14. The method of claim 13 wherein the weight of each pixel in the group varies inversely with the displacement.

15. The method of claim 13 wherein a sharpness parameter determines a sharpness of the interpolation kernel.

16. The method of claim 15 wherein the sharpness parameter is determined by:
   calculating a third degree polynomial passing through the group of pixels along the pixel alignment diagonal; and
   sampling the polynomial in the ideal pixel location.

17. A computer program product comprising a machine-readable medium tangibly embodying non-transitory program instructions thereon that, when executed by the machine, cause the machine to correct a Bayer image having pixels displaced from ideal pixel locations on a uniform Cartesian grid by shifting the pixels toward their ideal pixel locations, by:
   shifting chromaticity pixels with interpolation; and
   shifting luma pixels with one-dimensional interpolation along a luma pixel alignment diagonal.

18. A system for correcting a Bayer image having pixels displaced from ideal pixel locations on a uniform Cartesian grid by shifting the pixels toward their ideal pixel locations, comprising:
   means for shifting chromaticity pixels with interpolation; and
   means for shifting luma pixels with one-dimensional interpolation along a luma pixel alignment diagonal.

19. A system for correcting a Bayer image having pixels displaced from ideal pixel locations on a uniform Cartesian grid by shifting the pixels toward their ideal pixel locations, comprising:
- a processor; and
- a memory that stores instructions that, when executed by the processor, cause the processor to:
- shift chromaticity pixels with interpolation; and
- shift luma pixels with one-dimensional interpolation along a luma pixel alignment diagonal.

20. An integrated circuit for correcting a Bayer image having pixels displaced from ideal pixel locations on a uniform Cartesian grid by shifting the pixels toward their ideal pixel locations, comprising:
- a first circuit that element shifts chromaticity pixels with interpolation; and
- a second circuit element that shifts luma pixels with one-dimensional interpolation along a luma pixel alignment diagonal.

21. A processor-implemented method for correcting a Bayer image having pixels displaced from ideal pixel locations on a uniform Cartesian grid by shifting the pixels toward their ideal pixel positions, wherein processor hardware implements the method by performing actions, comprising:
- shifting chromaticity pixels with interpolation; and
- shifting luma pixels with interpolation, where the shifting of Yr pixels depends on Yb pixels, and vice-versa.

22. A computer program product comprising a machine-readable medium tangibly embodying non-transitory program instructions thereon that, when executed by the machine, cause the machine to correct a Bayer image having pixels displaced from ideal pixel locations on a uniform Cartesian grid by shifting the pixels toward their ideal pixel locations, by:
- shifting chromaticity pixels with interpolation; and
- shifting luma pixels with interpolation, where the shifting of Yr pixels depends on Yb pixels, and vice-versa.

23. A system for correcting a Bayer image having pixels displaced from ideal pixel locations on a uniform Cartesian grid by shifting the pixels toward their ideal pixel locations, comprising:
- means for shifting chromaticity pixels with interpolation; and
- means for shifting luma pixels with interpolation, where the shifting of Yr pixels depends on Yb pixels, and vice-versa.

24. A system for correcting a Bayer image having pixels displaced from ideal pixel locations on a uniform Cartesian grid by shifting the pixels toward their ideal pixel locations, comprising:
- a processor; and
- a memory that stores instructions that, when executed by the processor, cause the processor to:
- shift chromaticity pixels with interpolation; and
- shift luma pixels with interpolation, where the shifting of Yr pixels depends on Yb pixels, and vice-versa.

25. An integrated circuit for correcting a Bayer image having pixels displaced from ideal pixel locations on a uniform Cartesian grid by shifting the pixels toward their ideal pixel locations, comprising:
- a first circuit that element shifts chromaticity pixels with interpolation; and
- a second circuit element that shifts luma pixels with interpolation, where the shifting of Yr pixels depends on Yb pixels, and vice-versa.

* * * * *